No. 850,485. PATENTED APR. 16, 1907.
J. F. OTT.
APPARATUS FOR PRODUCING RUBBER STRIPS.
APPLICATION FILED MAR. 18, 1905.

7 SHEETS—SHEET 1.

Witnesses
Edgworth Greene
Delos Holden

Inventor
John F. Ott
By his Attorney
Frank L. Ayer

No. 850,485. PATENTED APR. 16, 1907.
J. F. OTT.
APPARATUS FOR PRODUCING RUBBER STRIPS.
APPLICATION FILED MAR 18, 1905.

7 SHEETS—SHEET 3.

No. 850,485. PATENTED APR. 16, 1907.
J. F. OTT.
APPARATUS FOR PRODUCING RUBBER STRIPS.
APPLICATION FILED MAR. 18, 1905.
7 SHEETS—SHEET 7.
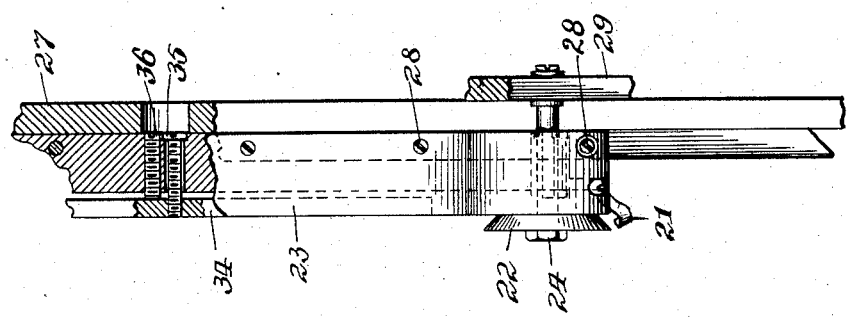
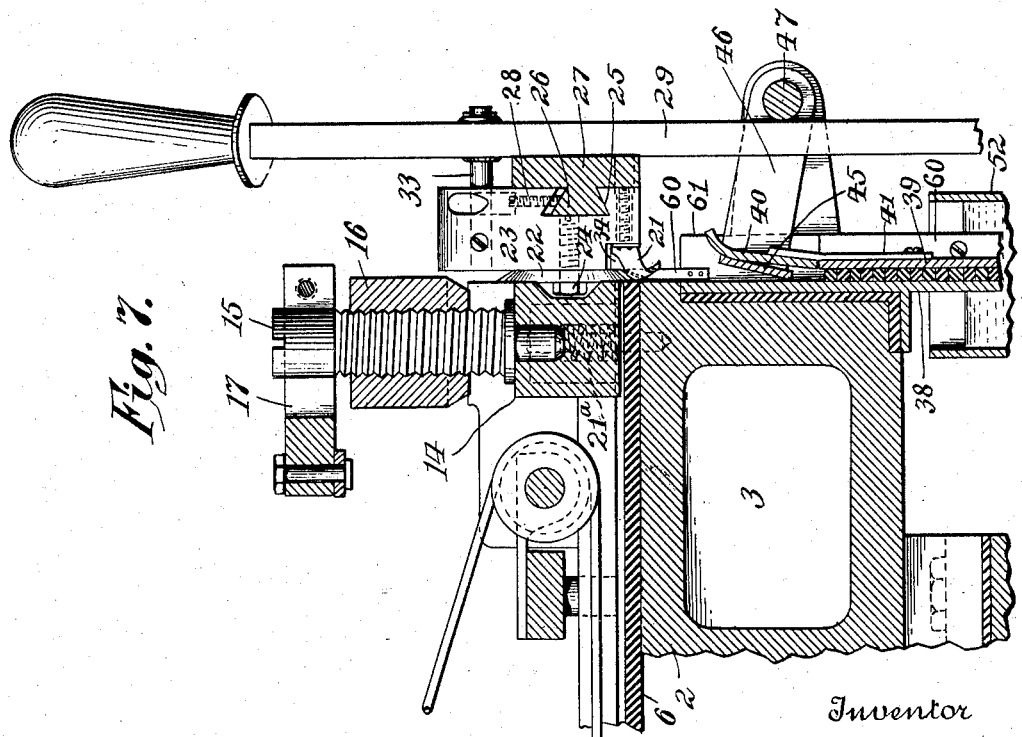
Witnesses
Edgeworth Greene
Delos Holden
Inventor
John F. Ott
By his Attorney
Frank T. Ayer

UNITED STATES PATENT OFFICE.

JOHN F. OTT, OF ORANGE, NEW JERSEY, ASSIGNOR TO EDISON STORAGE BATTERY COMPANY, OF WEST ORANGE, NEW JERSEY, A CORPORATION OF NEW JERSEY.

APPARATUS FOR PRODUCING RUBBER STRIPS.

No. 850,485.     Specification of Letters Patent.     Patented April 16, 1907.

Application filed March 18, 1905. Serial No. 250,731.

*To all whom it may concern:*

Be it known that I, JOHN F. OTT, a citizen of the United States, residing at Orange, county of Essex, and State of New Jersey, have invented certain new and useful Improvements in Apparatus for Producing Rubber Strips, of which the following is a specification.

My invention relates to apparatus by means of which strips of hard rubber or similar material, preferably rectangular in cross-section and free from warped or distorted portions, may be rapidly and cheaply produced from long continuous sheets of such material. Such strips as those referred to are useful for a number of purposes, but more particularly for separating adjacent plates of opposite polarity in storage batteries. Heretofore strips of this character have been produced with difficulty and at a high cost by a molding process.

I have discovered that it is possible to produce suitable strips by subjecting a sheet of material to a sufficient heat to soften the same, rigidly holding the sheet by means of a suitably-applied clamping device, and then passing a knife or similar cutter through the material while it is still soft and at a point where it is firmly held against yielding. Immediately after the strip is severed from the sheet means are applied to the same for straightening it and for holding it in a straightened position until it is cool, the cooling being preferably hastened by a refrigerating device, such as a tank of cold water; the result being that the strip when released from the holding means is entirely cool and hard and remains permanently in the form desired.

My invention will now be more particularly described and claimed.

Reference is hereby made to the accompanying drawings, in which the same reference-numerals are used to designate corresponding parts in the several views, of which—

Figure 1:
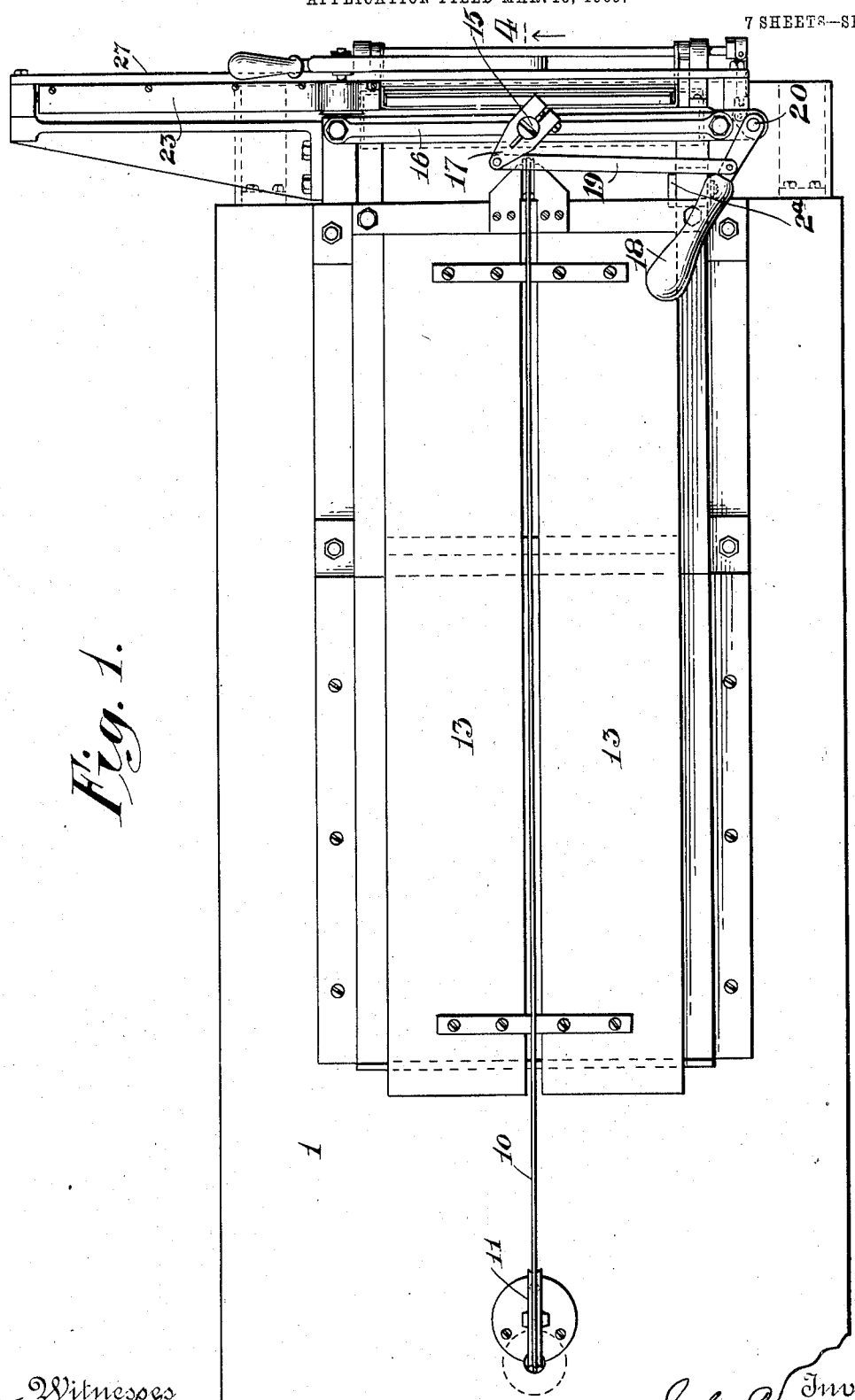
Figure 2:
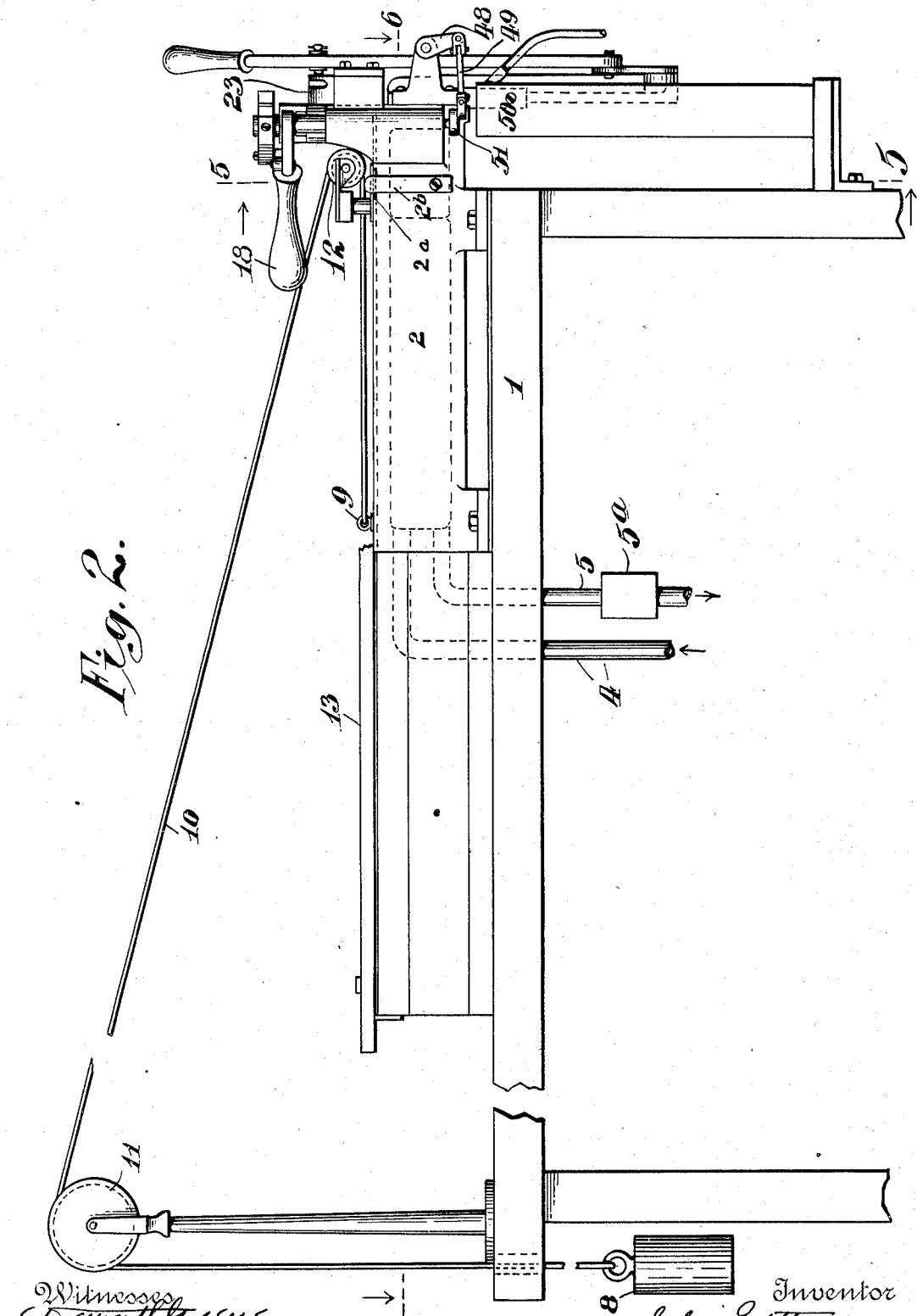
Figure 3:
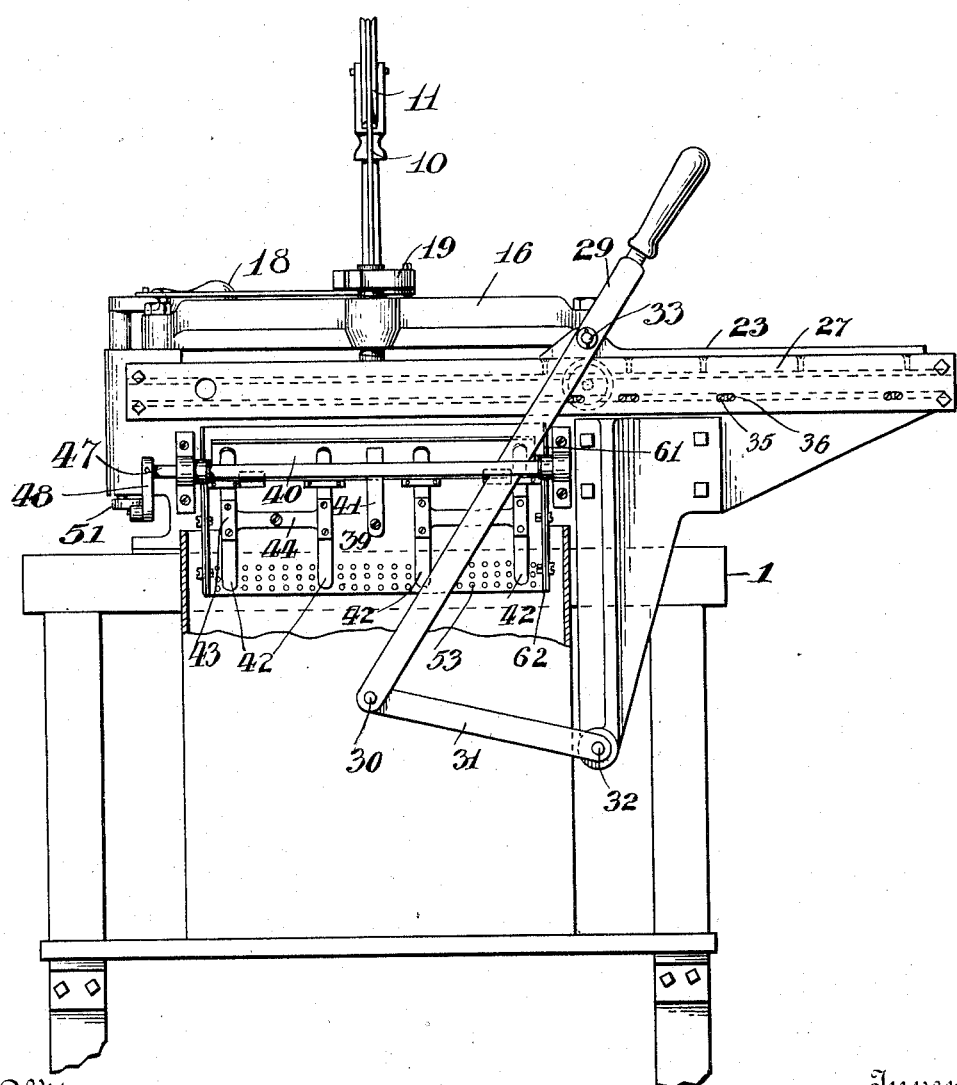
Figure 4:
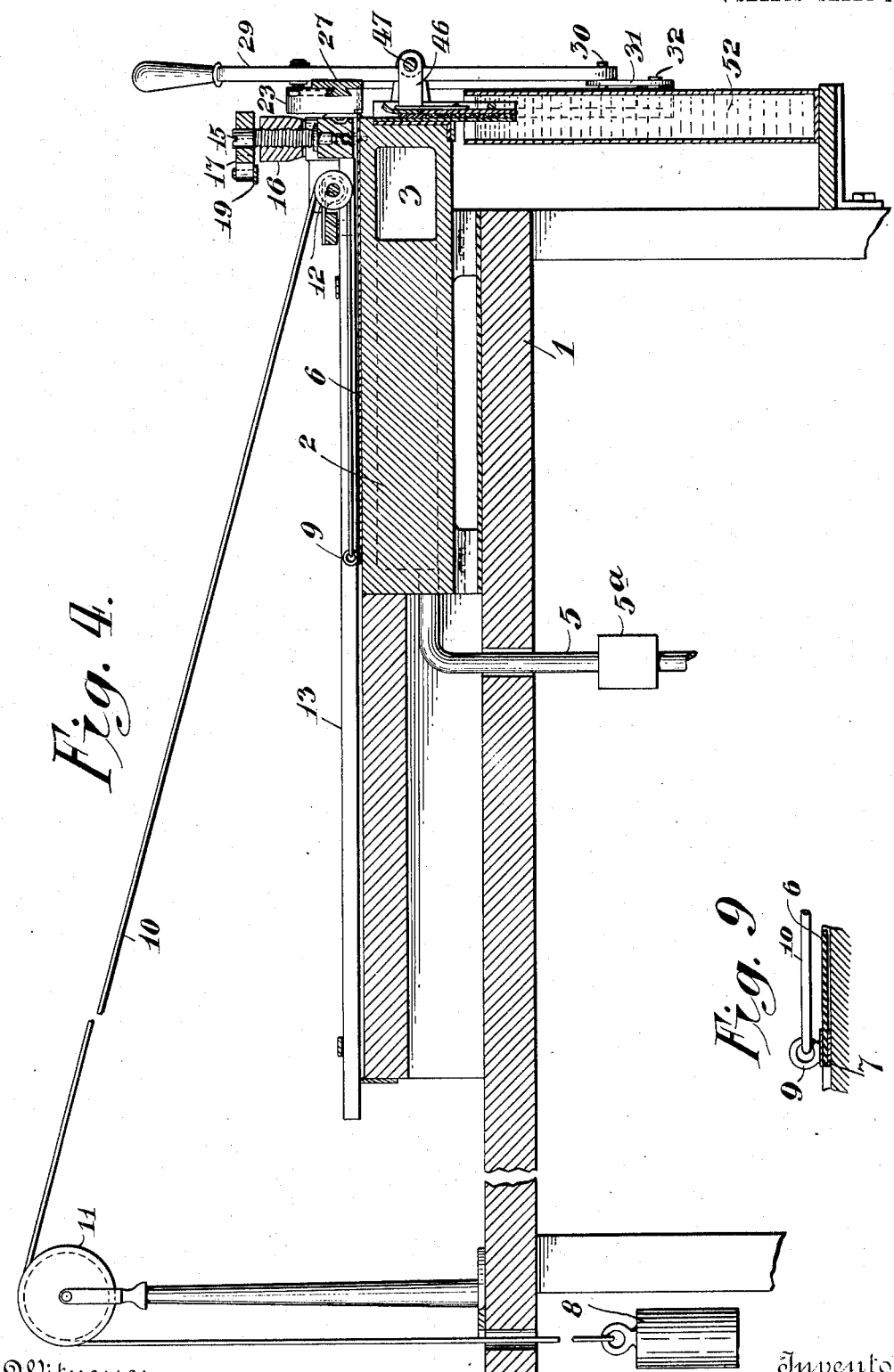
Figure 5:
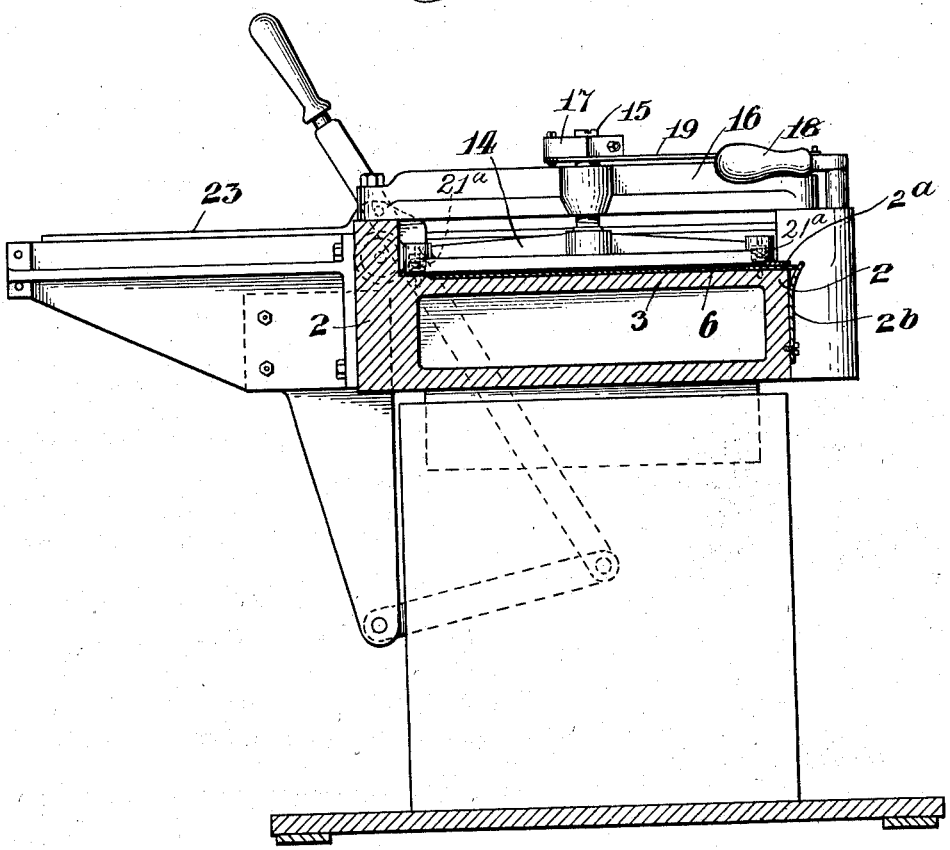
Figure 6:
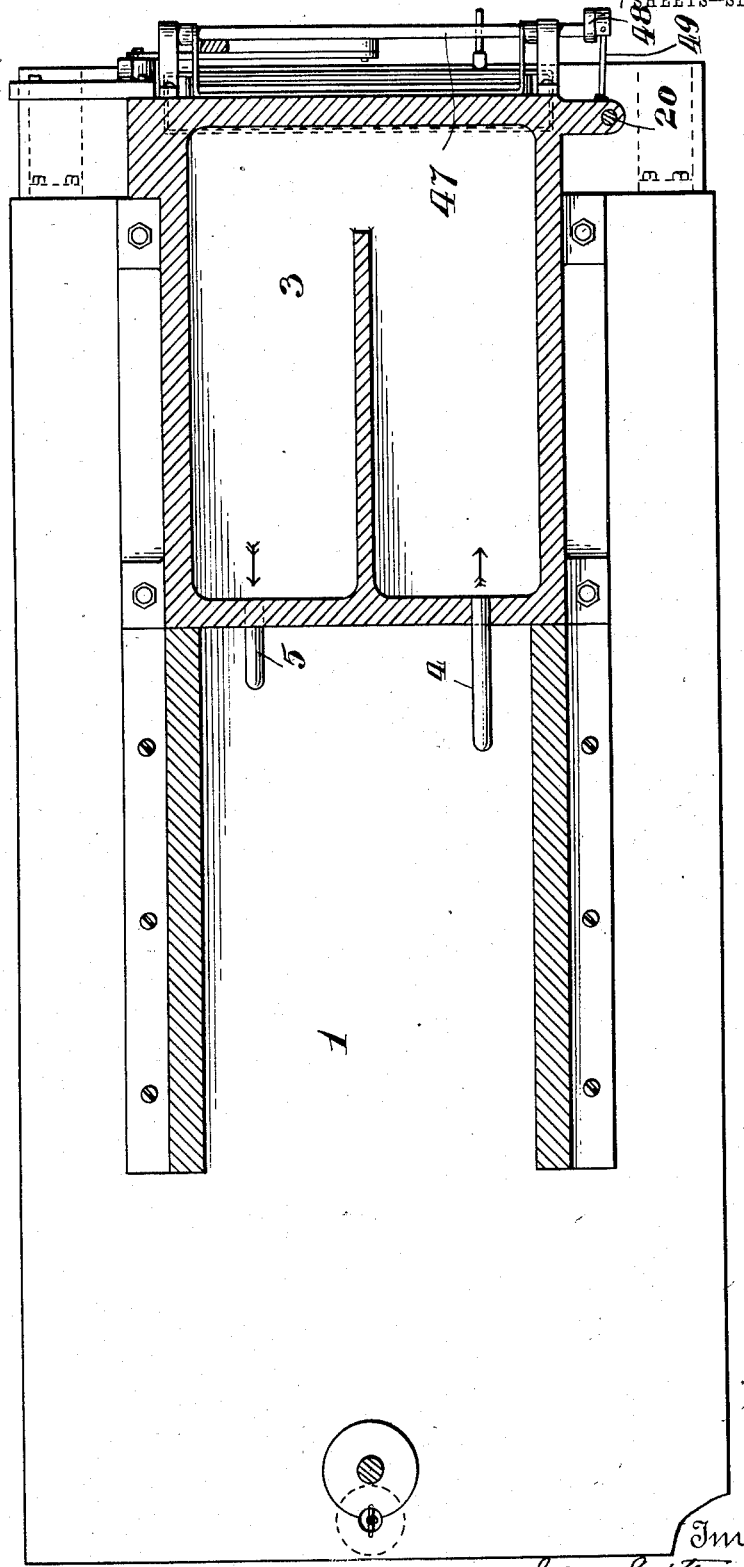

Figure 1 is a plan illustrating one form of apparatus in which my invention may be embodied. Figs. 2 and 3 are side and end elevations, respectively, of the same; Fig. 4, a section on the line 4 4 of Fig. 1. Fig. 5 is a section on the line 5 5 of Fig. 2. Fig. 6 is a section on the line 6 6 of Fig. 2. Fig. 7 is an enlarged detail of a portion of Fig. 4. Fig. 8 is an enlarged detail view showing in plan, partly in section, the cutter, cutter-slide, gage, guide, and operating-lever. Fig. 9 is a detail sectional view of the holder used for feeding the sheet of material operated upon toward the cutter.

The apparatus shown comprises a supporting-frame 1 of any suitable form, carrying a table 2, upon which the sheet of material 6 is laid and over which it progresses toward the cutter. The top of the table has a countersunk portion, whose width is equal to that of the strip, and the latter occupies the same, being held against one side of the depression by a block $2^a$, pressed against the strip by a spring $2^b$. It is necessary that this table be kept at a sufficient heat to cause the material to be thoroughly softened by the time it reaches the cutter. In order to accomplish this, I preferably form the same with a steam-chamber 3, provided with an inlet 4 for admitting steam under ordinary pressure and an outlet 5 for the escape of the condensed steam. The outlet-pipe 5 is provided with a steam-trap $5^a$ of any approved form, which allows the water formed by condensation to be blown off whenever the temperature falls below a given point—for instance, 105° centigrade—thereby maintaining a practically constant high temperature in the chamber 3.

The material to be treated is in the form of a long sheet 6, the width of which is practically the same as that of the depressed portion of the table and equal to the length of the strips which are to be produced. As each strip is removed from the forward edge of the sheet by the cutter it is necessary that the sheet be fed forward. For this purpose I provide a holder 7, (see Fig. 9,) which receives the rear edge of the sheet and is caused to press against the same by means of a weight 8, connected to the holder-ring 9 by means of a rope or wire 10, passing over the pulleys 11 and 12. This feed mechanism provides a constant pressure upon the sheet 6, since it is independent of the length of the sheet. In order to prevent bending or buckling of the said sheet, the boards 13 13 are placed thereon, said boards being separated by a longitudinal space of sufficient width to allow the ring 9 to be carried along as the material is fed forward. These boards perform also the additional function of a blanket for the material which is to be cut, so that it remains in a warm and soft condition suitable for being operated upon.

The cutting operation takes place at the forward edge of the table 2, the arrangement of parts being clearly shown in Fig. 7. A vertically-movable clamping-block 14 is situated directly above the material 6, at the forward edge of the table 2. This block is provided for the purpose of firmly holding the softened material while the cutter is operating to sever the same. The block is forced down upon the material with suitable pressure by means of a screw 15, threaded in a bridge 16, which is bolted to the table 2, as shown in Fig. 5. The screw 15 is operated by means of a clamp 17, operated by a hand-lever 18 through the connecting-link 19. (See Fig. 1.) The hand-lever 18 simultaneously operates a vertical rock-shaft 20 for a purpose which will be hereinafter referred to. When the handle 18 is moved in one direction, it is obvious that the clamping-block 14 will be pressed against the material 6 with considerable force. When the handle 18 is moved in the opposite direction, the screw 16 moves upward, and the block 14 follows the screw by reason of the coil-springs 21ª at each end thereof. (See Figs. 5 and 7.)

The cutter preferably consists of a circular knife 22, bolted firmly to the slide 23 by means of a bolt 24. The slide 23 is provided with a dovetail groove 25, which receives a horizontal rib 26 of corresponding shape, which is formed upon a bar 27, extending transversely across the forward end of the machine and bolted rigidly to the supporting-framework, as shown in Figs. 1 and 3. Screws 28 are threaded in the slide 23 and bear against the upper surface of the rib 26, thus preventing any lost motion between the rib and groove and providing an adjustment for wear of these parts. It will be seen that the knife 22 moves in a horizontal path immediately in front of and in shearing relation to the forward edges of the table 2 and block 14, the cutting edge extending slightly below the upper surface of the table. The slide 23 is operated by means of a hand-lever 29, pivoted at 30 to a link 31, which in turn is pivoted at 32 to the supporting-framework. The slide 23 carries a pin 33, upon which the upper end of the operating-lever 29 is rotatably mounted.

The width of the strip which is to be severed is determined by means of the gage 34, carried by the slide 23 and adjustable toward and away from the slide by means of a series of screws 35 and 36. (Clearly shown in Fig. 8.) One end of the slide 23 carries a piece 21, of spring metal, for the purpose of deflecting the strip as it is formed and freeing the knife from the end of the strip after the same has been completely severed from the sheet 6. The portion of the sheet which projects to form the strip is held against lateral movement by a rectangular pin 60, projecting upwardly from the forwardly-extending flange 61 of the plate 38, which is secured to the body of the machine. The rear side of this pin is beveled to permit the passage of the knife. (See Fig. 7.) Obviously this pin will prevent the severed strip from being carried along by the knife and will insure its dropping into the receptacle now to be described. It also prevents yielding during the cutting operation of that portion of the sheet which is to form the strip.

The means for straightening and holding the strips while cooling is composed of two parallel vertical plates 38 and 39, having forwardly-extending lateral flanges 61 and 62, respectively, which are bolted together. (See Fig. 3.) An inclined plate 40 is secured to the upper portion of the plate 39 by means of an elastic or spring strip 41 and forms with the upper plate 38 a hopper for receiving the strips as they fall from the knife. The plate 39 is provided with openings, in which are located presser-plates 42, carried on opposite ends of a supporting spring-strip 44, the said spring serving to press the plates 42 against the cut strips, thereby pressing the latter against the plate 38. The strips are packed into the holder just described by means of an oscillating packer 45, consisting of a plate of about the same length as the strips and holding-plates 38 39 and carried by the supporting-arms 46, fixed to a rock-shaft 47. This shaft is oscillated by means of a crank 48, link 49, crank 50, and crank-disk 51, the latter being fixed to the lower end of the shaft 20, hereinbefore described. By this means the packer 45 is given one downward packing movement every time the clamping-block 14 is raised or lowered, which is of course as often as the cutter is operated to remove a strip of material from the sheet 6.

The lower portions of the holding-plates 38 and 39 extend into a tank 52, containing cold water, for the purpose of cooling the strips while they are in the holder, whereby they will become hardened while held in the desired shape which they retain when removed from the holder, said lower portions of the said plates 38 and 39 being preferably provided with perforations 53 in order to expose the strips more effectively to the action of the water. The operation of the packer forces the strips down between the plates 38 and 39 until they eventually pass from between the lower eges of said plates into the lower portion of the tank 52.

The operation of the device is briefly as follows: A sheet 6, of hard rubber or similar material, is laid upon the heated table 2, being held down thereon and protected by means of boards 13. The clamping-block 14 being in its elevated position, the sheet 6 is moved forward by means of the weight 8 operating through the wire 10 and holder 7 until the forward edge of the sheet abuts against the gage 34. The hand-lever 18 is now operated to press the block 14 firmly down upon the material 6. The hand-lever 29 is then operated (from left to right in Fig. 3) so as to carry the knife 22 along the forward edges of the block 14 and table 2 and through the material 6, whereby a strip of material is severed therefrom and falls into the hopper between the plates 40 and 38. The next movement of the hand-lever 18 causes the packer 45 to press the strip down between the plates 38 and 39, whereby the strip, being still soft, is straightened. The forcing of the successive strips down into the holder causes them to travel down vertically between the plates 39 until they reach the tank 52 containing cold water, by which they are chilled and hardened while still in the holder, and the strips are eventually forced from between the lower edges of the said plate into the lower portion of the tank 52.

Having now described my invention, what I claim as new therein, and desire to secure by Letters Patent, is as follows:

1. In an apparatus of the character described, a heated table, means for clamping upon said table the material to be treated, a cutter, and means for passing said cutter through said material in close proximity to the clamping means, substantially as set forth.

2. In an apparatus of the character described, a heated table, means for clamping upon said table the material to be treated, a cutter, means for passing said cutter through the material in close proximity to the clamping means, and means for straightening the severed portion, substantially as set forth.

3. In an apparatus of the character described, means for heating the material to be treated, means for rigidly holding the softened material, a cutter, means for passing said cutter through the material in close proximity to the holding means, means for straightening the severed portion and means for cooling the same, substantially as set forth.

4. In an apparatus of the character described, a heated table, means for clamping a sheet of material upon said table adjacent one edge thereof and a cutter mounted to move in shearing relation to said edge, substantially as set forth.

5. In an apparatus of the character described, a heated table, a guide, a cutter-support moving on said guide, a cutter carried by said support, a clamp for holding a sheet of material upon said table and a gage for determining the width of material to be cut, substantially as set forth.

6. In an apparatus of the character described, a heated table, a guide, a cutter-support moving on said guide, a cutter carried by said support, a clamp for holding a sheet of material upon said table, and an adjustable gage for determining the width of material to be cut, substantially as set forth.

7. In an apparatus of the character described, a heated table, means for clamping a sheet of material upon said table adjacent one edge thereof, a cutter mounted to move in shearing relation to said edge and means for progressively feeding a sheet of material along said table toward said cutter, substantially as set forth.

8. In an apparatus of the character described, a heated table, means for clamping a sheet of material upon said table adjacent one edge thereof, a cutter mounted to move in shearing relation to said edge, and feeding means exerting a constant stress for progressing the sheet of material along said table toward said cutter, substantially as set forth.

9. In an apparatus of the character described, the combination of a vertically-moving clamping-block 14, a fixed member 2, a screw 15 for depressing the block 14, means for operating said screw, and springs for elevating the block 14 when the depressing-screw is reversed, substantially as set forth.

10. In an apparatus of the character described, a fixed member 27, having a horizontal guide 26, a slide 23 moving on said guide and provided with a cutter 24 and a gage 34, substantially as set forth.

11. In an apparatus of the character described, a fixed member 27 having a horizontal guide 26 and a slide 23 moving on said guide and provided with a cutter 24 and a deflector 37 having a substantially vertical portion close to and substantially in line with the cutting edge of the cutter, whereby it is adapted to deflect the severed material away from the stock, substantially as set forth.

12. In an apparatus of the character described, a holder having vertical walls which diverge at the top forming a hopper to catch the cut strips, a movable packer to force the strips between the vertical walls and a cooling device surrounding the lower portion of said holder, substantially as set forth.

13. In an apparatus of the character described, a movable cutter, a holder having vertical walls which diverge at the top forming a hopper to catch the cut strips, a spring for pressing the strips against one of the walls of the holder and a movable packer distinct from said cutter to force the strips downward in the holder, substantially as set forth.

14. In an apparatus of the character described, a holder having vertical walls which diverge at the top forming a hopper to catch the cut strips, a spring for pressing the strips against one of the walls of the holder, a movable packer to force the strips downward in the holder, and a cooling device surrounding the lower portion of said holder, substantially as set forth.

15. In an apparatus of the character described, a holder having vertical walls which diverge at the top forming a hopper to catch the cut strips, a movable packer to force the strips between the vertical walls, said packer comprising a pivotally-supported strip movable into and out of said hopper, and means for operating said packer, substantially as set forth.

16. In an apparatus of the character described, a movable clamping-block, a movable cutter, a holder for receiving the severed strips, a packer for forcing said strips into said holder, means for operating said clamping-block, and connections whereby each operation of the clamping-block is accompanied by an operation of the packer, substantially as set forth.

17. In an apparatus of the character described, a heated table having a longitudinally-extending depression, means for clamping a sheet of material upon said table adjacent one edge thereof, a cutter mounted to move in shearing relation to said edge, means for progressively feeding a sheet of material above said table in the depression thereof and toward said cutter, and means for holding said sheet against one side of said depression, substantially as set forth.

18. In an apparatus of the character described, a heated table, means for clamping a sheet of material upon said table adjacent one edge thereof, a cutter mounted to move in shearing relation to said edge, and a fixed stop or abutment so situated as to offer lateral support to that portion of the strip projecting beyond the edge of said table, substantially as set forth.

This specification signed and witnessed this 17th day of March, 1905.

JOHN F. OTT.

Witnesses:
DELOS HOLDEN,
FRANK L. DYER.